No. 859,963. PATENTED JULY 16, 1907.
N. MINSTER.
SNOW SHOE ATTACHMENT FOR WHEELED VEHICLES.
APPLICATION FILED MAR. 18, 1907.
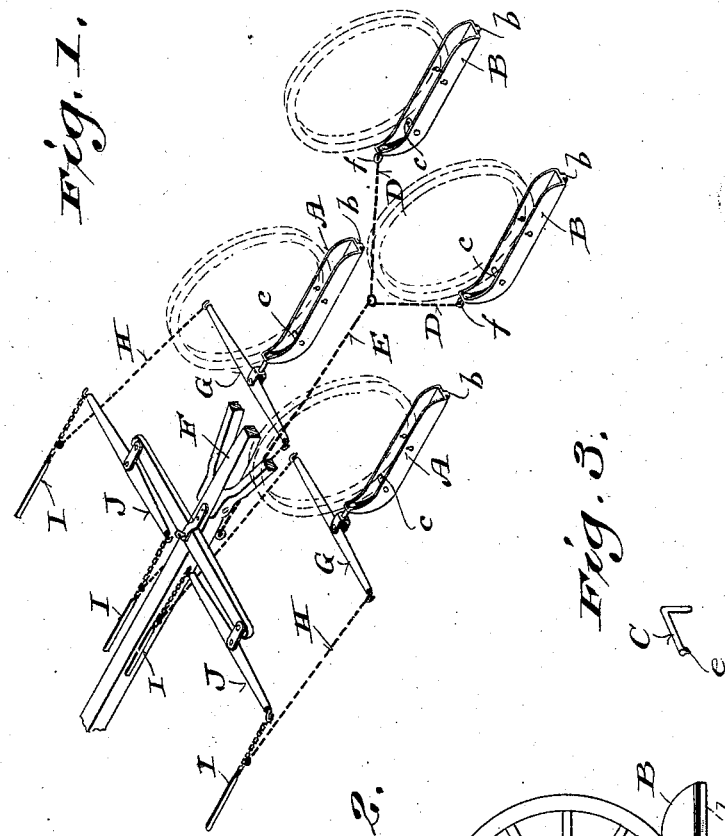
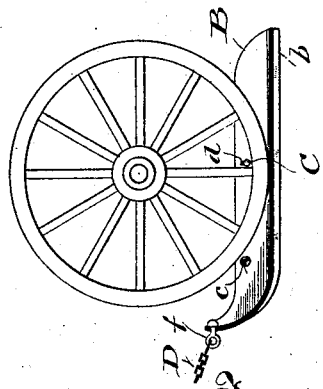

UNITED STATES PATENT OFFICE.

NICKLAS MINSTER, OF SHEBOYGAN, WISCONSIN.

SNOW-SHOE ATTACHMENT FOR WHEELED VEHICLES.

No. 859,963.  Specification of Letters Patent.  Patented July 16, 1907.

Application filed March 18, 1907. Serial No. 362,941.

*To all whom it may concern:*

Be it known that I, NICKLAS MINSTER, a citizen of the United States, and a resident of Sheboygan, in the county of Sheboygan and State of Wisconsin, have invented certain new and useful Improvements in Snow-Shoe Attachments for Wheeled Vehicles; and I do hereby declare that the following is a full, clear, and exact description thereof.

The invention has for its object to provide simple, economical snow-shoe attachments for wheeled-vehicles, particular reference being had to preventing side slip of the shoes and their connection with the running and draft gear of a vehicle.

Hence said invention consists in certain peculiarities of construction and combination of parts herein shown, described and claimed.

Figure 1 of the drawings represents a perspective view of a set of my improved snow-shoes and illustrates the manner of connecting the same with the running and draft-gear of a two-horse four-wheel vehicle, the wheels being shown by dotted lines, Fig. 2, a side elevation of one of the wheels and a snow-shoe therewith partly in longitudinal section, and Fig. 3, a perspective view of a key constituting a detail of the invention.

Referring by letter to the drawings, A indicates each of a pair of snow-shoes for the front wheels of a vehicle, and B each of a pair of similar shoes for the hind wheels of the same vehicle.

Each shoe is preferably of metal, cast or otherwise made, and said shoe comprises a sole turned up at one end, sides and a central rib $b$ lengthwise of the sole upon the underside of same. In practice, the rib cuts into the snow and prevents side slip of the shoe.

A cross piece $c$ in the shoe serves as a front chock for the wheel engaged with said shoe, this wheel being fastened in place by any suitable means, preferably a key C in the shape of a crank having one end thereof provided with a bit $e$, key-holes $d$ being provided in the sides of the aforesaid shoe for the passage of the bitted end of the key. In practice, the key extends over the rim of the wheel in the shoe and is turned to have its bitted and cranked ends oppose the sides of said shoe in a vertical direction, as is heretofore old in the art.

The upturned forward ends of the rear wheel shoes of a set are coupled, by means of eye-bolts $f$ and a chain D, this chain being joined midway of its length to another chain E fastened to the tongue F or some other convenient part of the running-gear of a vehicle, and a swingletree G has swivel connection with the upturned end of each of the forward shoes. Chains H connect the ends of the swingletree with traces I attached to the swingletrees J of the draft-gear of the vehicle.

From the foregoing it will be understood that there is draft direct upon the shoes with which the vehicle-wheels are engaged and that said wheels move with said shoes without tendency to rotation this being an advantageous feature of my improvements.

I claim:

1. A set of snow-shoes attachable to the wheels of a vehicle, those in connection with the rear wheels being coupled to each other and the running gear of the vehicle, a swingle-tree in swivel-connection with each of the forward shoes, and means connecting the ends of these swingle-trees with the ends of those of the draft-gear of the vehicle.

2. A set of snow-shoes attachable to the wheels of a vehicle, a chain connected at its ends to the forward ends of the rear shoes, another chain connecting the middle of the one aforesaid with a convenient portion of the running-gear of the vehicle, swingletrees in swivel-connection with the forward ends of the front shoes, and means connecting the ends of these swingletrees with those of the draft-gear of the vehicle.

In testimony that I claim the foregoing I have hereunto set my hand at Sheboygan in the county of Sheboygan and State of Wisconsin in the presence of two witnesses.

NICKLAS MINSTER.

Witnesses:
FRED. KANTER,
HENRY J. NEUENS.